April 24, 1962 R. E. SAUZEDDE ET AL 3,031,053
ONE-WAY CLUTCH
Filed March 6, 1959
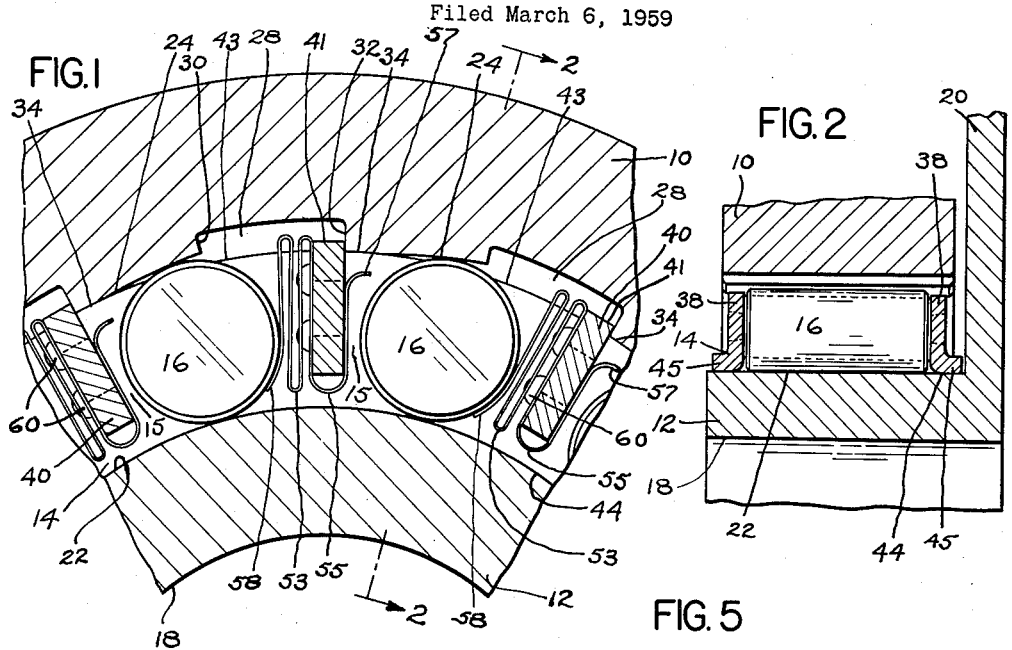
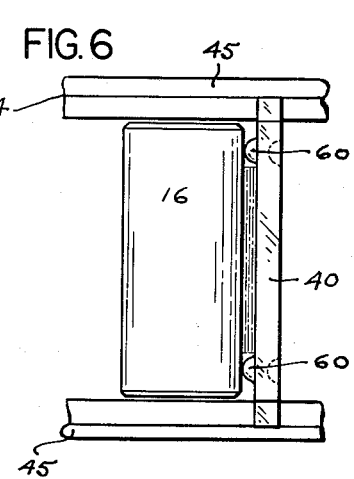
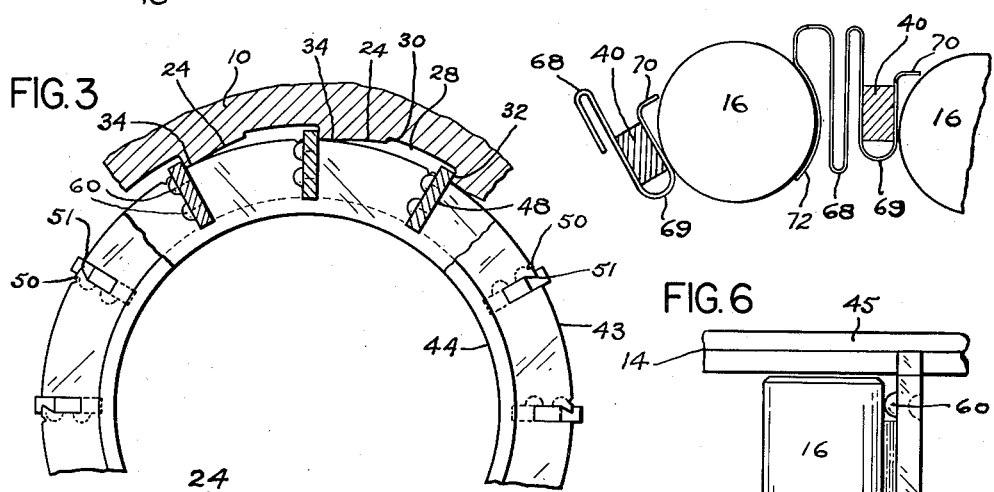
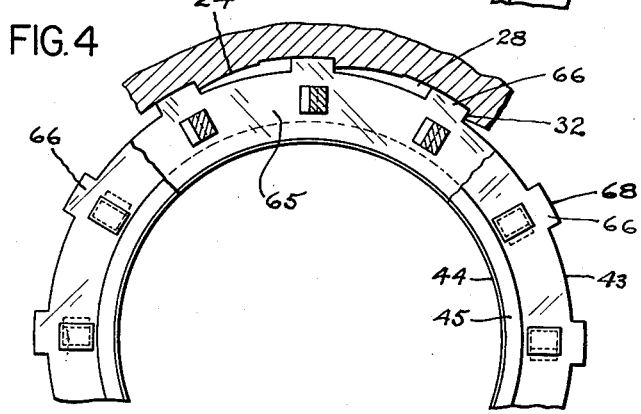
INVENTORS
RENE E. SAUZEDDE
WILLIAM BLINDER
BY Edward H. Goodrich
THEIR ATTORNEY

United States Patent Office 3,031,053
Patented Apr. 24, 1962

3,031,053
ONE-WAY CLUTCH
Rene E. Sauzedde, Terryville, and William Blinder, Newington, Conn., assignors to General Motors Corporation, Detroit, Mich., a corporation of Delaware
Filed Mar. 6, 1959, Ser. No. 797,780
11 Claims. (Cl. 192—45)

This invention relates to one-way clutches and particularly to an improved unit-handling one-way roller clutch.

Heretofore, one-way clutches of the roller type have had many objectionable features. These clutches embodied many small parts which had to be individually hand-assembled in operating position within the mechanism with which the clutch was being used thus resulting in an expensive and time-consuming assembly. Also, the rollers frequently failed to simultaneously enter into or out of clutch-driving engagement with the result that very heavy loads were suddenly imposed upon a very few rollers, and in many instances upon a single roller, causing clutch failure. Furthermore, the various spring arrangements employed to urge the rollers into position did not act in coordination and prevented the use of a large number of rollers through which the driving load could be uniformly and evenly distributed. As a result, many of such clutches were severely overloaded and had to be replaced with other forms of clutches. It is recognized when one or only a few of the rollers in a roller clutch are suddenly subjected to full load as often occurs in these prior roller clutch structures, that the roller movement often is accompanied by a chattering and shock impact which damages the race rings and other clutch parts with resultant short life to the clutch.

It is, therefore, an object of this invention to provide an improved one-way clutch of the rolling-element type having a simple construction that may be quickly and easily installed and which has a high load-carrying capacity that is uniformly distributed between the rolling elements.

Another object of this invention is to provide an improved roller type clutch of compact design and having more load-carrying rollers than prior clutches of comparable size.

Another object of this invention is to provide an improved one-way roller clutch which may be easily pre-assembled and installed as a unit-handling assembly for one-way driving connection between a pair of relatively rotatable members.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

FIGURE 1 is a fragmentary cross sectional view of our one-way roller clutch;

FIGURE 2 is a fragmentary diametrical section taken along the line 2—2 of FIGURE 1;

FIGURE 3 illustrates one arrangement for mounting the cage within a race ring;

FIGURE 4 shows another arrangement for mounting the cage within a race ring;

FIGURE 5 is a fragmentary view showing another embodiment of the springs which urge the rollers into clutch-engaging positions; and FIGURE 6 is a fragmentary planned view showing one of the rollers mounted in a cage.

Our improved one-way clutch comprises a compact and easily installed unit-handling assembly that provides a positive unidirectional drive for many applications and which is particularly adapted for heavy duty use in torque converters and hydraulic transmissions for automobiles.

As illustrated, this one-way clutch has an outer race ring 10 radially spaced from and in coaxial relation with an inner race ring 12 through a suitable means as an outboard bearing, or, if desired, through an intervening cage. In the annular space between these race rings there is provided an annular cage 14 having circumferentially spaced pockets 15 each of which receives and guides a rolling element 16 engageable with both race rings 10 and 12. When one of the race rings tends to rotate faster than the other ring and in a clutch-driving direction, the rolling elements 16 simultaneously provide a one-way wedged driving engagement between these race rings to transmit rotation from one race ring to the other. When one of the race rings tends to rotate faster than the other ring but in an opposite and non-driving direction, the rollers 16 simultaneously disengage from their wedged driving engagement at which time no driving connection exists between these race rings. The rolling elements 16 are individually spring-urged into clutch-driving positions thus eliminating any lost motion at the start of a clutch-driving operation. The outer race ring 10 comprises any suitable rotatable member such as a gear that may be in driving or driven connection with other mechanism, and the inner race ring 12 is herein shown in the form of a sleeve or collar having an axial bore 18 for suitable mounting on a shaft to which the ring may be keyed if desired. As illustrated, this inner race ring has a radially extending annular flange 20 for driving or driven connection with other mechanism.

One of the race rings, as the inner race ring 12, is provided with a circular raceway 22 herein illustrated as cylindrical and coaxial with the bore 18. The other race ring, as the outer race ring 10, is provided with a series of corresponding circumferentially spaced arcuate cam portions or surfaces 24 radially spaced from the raceway 22 and forming therewith a series of circumferentially spaced narrowing throats in which the rollers 16 may be wedged in and released from a unidirectional driving engagement. It is not intended that this invention should be limited to this specific arrangement since it will be appreciated that alternatively the cylindrical raceway could be on the outer race ring and the cam surfaces could be on the inner race ring to produce a unidirectional driving relation. Each of the correspondingly positioned arcuate cam surfaces 24 are located out of radial alignment with any radius of the race rings and slopingly decrease their spacings with respect to the opposing raceway 22 to provide these narrowing or tapering throats. As herein illustrated, each of these corresponding tapering throats narrows in a counterclockwise direction so that the spacing from the raceway 22 at the counterclockwise end of each cam surface 24 is less than that of a roller diameter while the spacing at the other end of the cam surface exceeds that of the roller diameter. Hence, a relative race ring movement tending to wedge each roller 16 in its throat as viewed in FIGURE 1, provides a positive one-way driving relation between the race rings and an opposite relative race ring movement disengages these rollers from driving relation. The race ring having the cam surfaces 24 is cut away to form circumferentially spaced arcuate recesses 28 in alternating relation with the cam surfaces 24, these recesses extending between substantially radially disposed end walls 30 and 32. Short parti-cylindrical walls 34 of the same radius extend respectively from each end wall 32 to the end of the adjacent cam face 24.

The race rings 10 and 12 are preferably maintained in coaxial relation through the intervening cage 14 which has a pair of similar end rings 38 secured in axial spaced relation by circumferentially spaced cross bars 40. These cross bars, which may be generally rectangular in cross section and radially disposed with respect to the cage, terminate in outer ends 41 radially outwardly of cylindrical peripheries 43 on the end rings 38 and terminate radially inwardly between these rings 38 in radially spaced relation to an inner cylindrical wall 44 on each end ring 38. In the assembled clutch, the outer ends 41 of the cross bars 40 preferably do not engage the bottoms of the recesses 28. Each end ring wall 44 is in rotatably journalled engagement with the cylindrical raceway 22 as best shown in FIGURE 2. The outer cylindrical portions 43 of each end ring are journalled for partial rotation on the circumferentially spaced parti-cylindrical walls 34 of the outer race ring 10. The clockwise rotation of the cage 14 with respect to the outer race ring 10 is limited by the simultaneous abutting engagement of the outer end 41 of each cross bar against the end shoulder 32 of each arcuate recess 28. Each recess 28 is of a length to provide for partial cage rotation sufficient to prevent the cross bars 40 from restricting wedged driving engagement of any of the rollers 16 in their respective throats between the race rings. The length of each recess 28 preferably does not exceed the length of one of the cam portions 24. The radially disposed and circumferentially spaced cross bars 40 are shown in FIGURES 1 and 2 with reduced rectangular end portions which fit through corresponding recesses in the end walls of the cage and are staked in position to provide a rigid cage assembly. If desired, as shown in FIGURE 3, the generally rectangular cross bar ends may fit within corresponding radially disposed slots 48 in each end ring and portions of the end rings 50 may be deformed at 51 into locked clamping engagement with these cross bar ends as illustrated in FIGURE 3.

The rollers 16 have flat end walls in slidably guided relation with the flat inner end walls of the end rings 38 to maintain axial roller alignment, and these end walls may be slightly chamfered at their peripheries. Each cage pocket 15 is provided at one end with a generally accordion-shaped spring 53 that may be bent up from flat stock. These springs serve to individually urge the rollers into position for driving engagement between the cam surfaces 24 and the raceway 22 as shown in FIGURE 1. The circumferential spacing between adjacent cross bars 40 preferably is only a small amount in excess of a roller diameter to provide for the maximum number of rollers through which the driving load is uniformly distributed. However, this cross bar spacing is preferably such that a spring-urged roller in wedged driving engagement with the surfaces 22 and 24 will be located in spaced relation with respect to each of the adjacent cross bars. The right hand end of each spring 53 as viewed in FIGURE 1, has a looped portion 55 frictionally pressed over and gripping the opposing flat side faces of the cross bar 40 and terminating at its upper outer end in a lateral projection 57 which is normally in spaced relation to the adjacent roller 16. The counterclockwise end of each spring may terminate in an arcuate lip 58 matingly fitting against a portion of the roller periphery and urging the roller in a counterclockwise direction towards a clutch-driving position. With this arrangement, each spring 53 is slipped into position over its cross bar and the roller is demountably snapped between this spring and the protruding lug or projection 57 of the adjacent spring and held in unit-handling relation with the cage as generally shown in FIGURE 5 after which the entire cage assembly may be easily inserted as a unit into operative position between the race rings. Each cross bar 40 beyond the ends of the spring 53 is provided with a pair of lateral projections such as the struck-out portions 60 which limit the extent of clockwise movements of the rollers with respect to the cam portions and towards an adjacent cross bar so that the springs may not become completely collapsed and bent out of shape.

When there is no relative rotation between the race rings 10 and 12, the springs 53 will maintain the rollers 16 in engagement with the opposing raceway 22 and the cam surfaces 24 and locate the cross bars 40 against the respective shoulders 32 in the recesses 28. During an ensuing relative race ring rotation when the outer race ring 10 overruns the inner race ring 12 in a counterclockwise direction as viewed in FIGURE 1, or when the inner race ring 12 overruns the outer race ring 10 in a clockwise direction, the circumferentially spaced rollers will be relieved from their wedged engagement between the race rings and no driving relation will exist between the race rings. However, the springs 53 will locate each of the rollers in engagement with its cam surface 24 and with the raceway 22 preparatory to the next clutch-driving operation. When the outer race ring 10 tends to overrun the inner race ring in a clockwise direction as viewed in FIGURE 1, or when the inner race ring tends to overrun the outer race ring in a counterclockwise direction, the rollers will immediately and simultaneously wedge in driving engagement with the cam surfaces 24 and with the raceway 22 and provide a unidirectional drive between the race rings 10 and 12. Since each spring 53 yieldably locates its roller initially in a drive-engaging position, there will be no lost motion between the race rings when entering into clutch driving relation. Also, each roller will immediately take its full share of the load thus overcoming the objectionable feature in prior roller clutches wherein the load is often carried by only a few rollers.

In the embodiment of FIGURE 4, there is shown a slightly different cage having spaced end rings 65 provided with circumferentially spaced lugs 66 rotatably journalled at their outer ends 68 against the parti-cylindrical bottoms of the arcuate slots 28 and engageable against the ends of these slots at 32 to limit the extent of partial cage rotation in a manner comparable to that described with respect to the cross bars 40. Like the prior construction, cage flanges 45 are journalled at 44 on the inner ring raceway 22. The cage and roller assembly operate in the same manner as previously described.

In FIGURE 5, there is shown a slightly different embodiment of an accordion-shaped spring 68 arranged to slidably clamp over the cross bars 40 with a rearward loop 69 which terminates in a lateral projection 70 serving the same function as the projection 57. The forward leg of this spring 68 has an arcuate portion 72 lightly conforming with the adjacent roller 16 above and below the pitch circle formed by the roller axes. The arcuate fit of this spring against the roller coupled with the projection 70 of the adjacent spring and its rearward arm, facilitate the snapping of the rollers into and out of unit-handling relation with the cage.

We claim:

1. A one-way clutch comprising a pair of spaced relatively rotatable members one of which has a raceway, said other member having a cam portion spaced from and sloping towards the raceway, a cage located between the annular members and in relatively rotatable relation to said annular members, a rolling element guided by the cage and engageable in and disengageable from wedged driving relation between the cam portion and said raceway, resilient means securing the rolling element in unit-handling asssembly with the cage and yieldably locating the rolling element continuously in position for said wedged driving engagement and in continuous engagement with said cam portion and with said raceway, and means limiting the cage movement with respect to said other member.

2. A one-way clutch comprising a pair of relatively rotatable coaxial annular members one of which has an annular raceway, said other member having a cam surface radially spaced from and sloping towards the raceway, a rotatable annular cage between said members, a rolling element guided by the cage and engageable in and disengageable from one-way driving engagement with the cam surface and with the raceway, cooperating spring members holding the rolling element and cage in unit-handling relation, one of said spring members continuously locating the rolling element in its drive-engaging position, and mechanism limiting the extent of cage rotation with respect to said cam surface.

3. A one-way clutch comprising a pair of relatively rotatable coaxial annular members one of which has an annular raceway, said other member having a cam portion radially spaced from the raceway and forming with the raceway a throat of diminishing width, a rotatable annular cage between said annular members, means limiting the extent of relative rotation between the cage and said other member, said cage having a pocket, a rolling element received in the pocket and engageable in and disengageable from wedged one-way driving connection between the cam portion and the raceway, and spring means on the cage securing the cage and rolling element in unit-handling assembly and yieldably urging the rolling element towards its driving position, said spring means locating the cage at one end of said limited extent of rotation when said rolling element is disengaged from said one-way driving connection.

4. A one-way clutch comprising a pair of relatively rotatable coaxial annular members one of which has an annular raceway, said other member having a plurality of circumferentially spaced arcuate cam portions which slope towards the raceway in one direction circumferentially of the raceway, a rotatable annular cage journalled on said raceway and located between said annular members, the cage having circumferentially spaced pockets respectively adjacent the cam portions, a roller in each cage pocket, said rollers being arranged for engagement in and for release from one-way wedged driving engagement with one of said cam portions and with said raceway, resilient means on the cage securing said rollers in unit-handling assembly with the cage, said means yieldably locating said rollers continuously in drive-engaging positions, cage cross bars limiting the extent of roller movement in the cage, and engageable means on the cage and on the member having said cam portions which limit the extent of cage rotation with respect to said cam portions.

5. A one-way clutch comprising a pair of relatively rotatable coaxial annular members one of which has an annular raceway, said other member having circumferentially spaced arcuate cam portions which slope towards the raceway in a direction circumferentially of the raceway away from driving rotation, a rotatable annular cage journalled on the raceway and journalled on said other member intermediate of the cam portions, the cage having circumferentially spaced pockets, a roller in each pocket and arranged to be received in and released from one-way wedged driving engagement with one of said cam portions and with said raceway, spring means on the cage and extending into each pocket for individually urging the rollers towards driving engagement, the spring means demountably securing the rollers in unit handling relation with the cage, and interengageable shoulders on the cage and on said other member limiting the cage rotation with respect to said other member, said spring means locating said shoulders in engagement when the rollers are released from said wedged one-way driving engagement.

6. A one-way clutch comprising a pair of relatively rotatable coaxial annular members one of which has an annular raceway, said other member having circumferentially spaced arcuate cam portions which correspondingly slope towards the raceway, a rotatable annular cage between said members, end rings on the cage, circumferentially spaced cross bars secured to and axially spacing the end rings, said cross bar and end rings providing circumferentially spaced cage pockets, a roller in each pocket, said rollers being engageable with and disengageable from wedged one-way driving engagement with the cam portions and with said raceway, a generally accordion-shaped spring mounted on each cross bar and having a curved lip engaging a roller and yieldably maintaining the roller in position for immediate driving engagement, a rearwardly extending projection on each spring cooperating with the arcuate portion of the adjacent spring to secure the rollers in unit-handling assembly with the cage, cage projections engageable with shoulder portions on said other relatively rotatable member which limit the cage to a partial rotation with respect to said cam portions, and said springs cooperatively locating the cage at one end of its partial rotation when the rollers are released from one-way driving engagement.

7. A one-way clutch comprising a pair of relatively rotatable coaxial annular members one of which has an annular raceway, said other member having circumferentially spaced arcuate cam portions which correspondingly slope towards the raceway to provide therewith a series of narrowing throats, a rotatable annular cage between said annular members, circumferentially spaced cross bars on the cage, a roller between each pair of adjacent cross bars and arranged to be received in and released from wedged driving engagement with said raceway and with said cam portions, springs on the cross bars continuously and yieldably locating the rollers in position for said wedged driving engagement, roller engaging projections on adjacent springs demountably securing the rollers and cage in a unit-handling assembly, shouldered portions on said other member in alternating relation with the cam portions, and cage lugs engageable with the shouldered portions limiting the extent of cage rotation away from the positions of roller driving engagement, said springs locating the cage lugs against said shoulders when the rollers are released from one-way wedged driving engagement.

8. A one-way clutch comprising a pair of relatively rotatable coaxial annular members one of which has an annular raceway, said other member having circumferentially spaced arcuate cam portions and alternating arcuate recesses, each recess extending between a pair of arcuately spaced shoulders, an annular cage coaxial with and between said annular members, said cage having circumferentially spaced pockets, a roller in each pocket and engageable in and disengageable from wedged one-way driving engagement with one of the cam portions and with said raceway, a radially extending cage projection movable between the shoulders in each recess and limiting the cage rotation with respect to said other member to a distance less than the arcuate length of one of said cam portions, and spring members mounted on the cage in engagement with the rollers and securing said rollers in unit-handling assembly with the cage and each spring member, each of said spring members continuously locating one of said rollers in position for said one-way wedged driving engagement.

9. A one-way clutch comprising a pair of relatively rotatable coaxial annular members one of which has an annular raceway, said other member having circumferentially spaced corresponding arcuate cam portions which slope towards the raceway in one direction circumferentially of the raceway, said other member having an arcuate recess between each pair of adjacent cam portions, a substantially radial shoulder at each end of each recess, an annular cage between and journalled on both of said annular members and having circumferentially spaced pockets, a roller in each pocket engageable with and disengageable from one-way wedged driving engagement with one of the cam portions and with the raceway, cage projections respectively movable between the shoulders in each recess and limiting the cage to a partial rotation with respect to said cam portions and not exceeding the length of one of the cam portions, circumferentially spaced springs mounted on the cage in alternating relation between said rollers, projections on adjacent springs securing an intervening roller in unit-handling assembly with said cage, and each spring yieldably locating an adjacent roller in drive engaging position in continuous contact with one of said cam portions and with said raceway.

10. A one-way clutch comprising a pair of relatively rotatable coaxial annular members one of which has an annular raceway, said other member having circumferentially spaced arcuate cam portions which correspondingly slope towards the raceway, a rotatable annular cage between and journalled on said members, circumferentially spaced cross bars on the cage, a roller between each pair of cross bars, said rollers being engageable in and disengageable from one-way wedged driving engagement with one of said cam portions and with the raceway, interengageable shoulder portions on the cage and on said other member limiting the cage to a partial rotation with respect to said other member through a distance less than the length of one of the cam portions, roller engaging springs on the cross bars, projections on said springs securing the rollers in demountable assembled relation with the cage, a resilient lip on each spring yieldably locating one of said rollers in a position for immediate one-way wedged driving engagement, and cross bar means limiting the extent of compression of the springs by the rollers.

11. A one-way clutch comprising a pair of relatively rotatable coaxial annular members one of which has an annular raceway, said other member having circumferentially spaced arcuate cam portions which slope towards the raceway in one direction circumferentially of the raceway, a rotatable annular cage between said members, end rings on the cage, circumferentially spaced cross bars between and secured to the end rings, rollers respectively located between adjacent cross bars for engagement in and disengagement from one-way wedged driving engagement with the raceway and with one of said cam portions, a spring mounted on the cage between each pair of adjacent rollers, said springs individually and yieldably positioning each roller in contact with one of said cam portions and against said raceway in a drive-engaging position, a roller engaging lip on each spring, a lateral projection on each spring, the lip on one spring cooperating with the lateral projection of the adjacent spring to demountably hold the intervening roller in unit-handling relation with said cage, and cooperating means on the cage and on said other member limiting the extent of cage rotation relative to said cam portions.

References Cited in the file of this patent
UNITED STATES PATENTS

| | | |
|---|---|---|
| 1,642,645 | Constantinesco | Sept. 13, 1927 |
| 2,029,244 | Linder | Jan. 28, 1936 |
| 2,371,653 | Schuckers | Mar. 20, 1945 |
| 2,815,838 | Dodge | Dec. 10, 1957 |
| 2,843,238 | Rozner | July 15, 1958 |
| 2,892,522 | Moo | June 30, 1959 |